(12) United States Patent
Asai et al.

(10) Patent No.: US 8,820,814 B2
(45) Date of Patent: Sep. 2, 2014

(54) VEHICLE SEAT

(75) Inventors: Takahiro Asai, Aichi-gun (JP); Shin Maezawa, Nisshin (JP); Hideki Kobayashi, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/001,812

(22) PCT Filed: Mar. 8, 2012

(86) PCT No.: PCT/IB2012/000454
§ 371 (c)(1),
(2), (4) Date: Aug. 27, 2013

(87) PCT Pub. No.: WO2012/123799
PCT Pub. Date: Sep. 20, 2012

(65) Prior Publication Data
US 2013/0341951 A1 Dec. 26, 2013

(30) Foreign Application Priority Data
Mar. 14, 2011 (JP) ................................ 2011-055593

(51) Int. Cl.
*B60N 2/00* (2006.01)
*B60N 2/015* (2006.01)
*B60N 2/005* (2006.01)
*B60N 2/36* (2006.01)
*B60N 2/68* (2006.01)

(52) U.S. Cl.
CPC ........... *B60N 2/005* (2013.01); *B60N 2002/684* (2013.01); *B60N 2/682* (2013.01); *B60N 2205/35* (2013.01); *B60N 2/015* (2013.01); *B60N 2/36* (2013.01)
USPC .............................................. 296/63

(58) Field of Classification Search
USPC .............................. 296/63, 65.17; 297/378.1
See application file for complete search history.

(56) References Cited

U.S. PATENT DOCUMENTS

| 4,103,964 A | * | 8/1978 | Klingelhofer et al. ..... 297/367 R |
| 4,909,571 A | * | 3/1990 | Vidwans et al. ......... 297/378.11 |
| 4,958,877 A | | 9/1990 | Lezotte et al. |
| 4,998,772 A | * | 3/1991 | Safran et al. ............. 297/354.12 |

(Continued)

FOREIGN PATENT DOCUMENTS

| DE | 199 20 385 A1 | 11/2000 |
| FR | 2 765 532 A1 | 1/1999 |

(Continued)

OTHER PUBLICATIONS

Jan. 15, 2013 Office Action issued in Japanese Patent Application No. JP 2011-055593 (partial translation).

*Primary Examiner* — Kiran B Patel
(74) *Attorney, Agent, or Firm* — Oliff PLC

(57) ABSTRACT

In a vehicle rear seat, slits are respectively formed in side wall portions of retainers provided on a vehicle body side and are respectively open at upper end sides of the side wall portions. Hinge pins respectively provided at lower end sides on side portions of a rear seat back are inserted in the corresponding slits to thereby couple the rear seat back to the vehicle body side via the retainers. Furthermore, in the vehicle rear seat, distal end sides of the hinge pins, that is, portions that protrude outward of the rear seat back, are respectively covered with covers attached to the corresponding retainers.

8 Claims, 14 Drawing Sheets

(56) References Cited

U.S. PATENT DOCUMENTS

| | | | |
|---|---|---|---|
| 5,007,680 A * | 4/1991 | Miyauchi et al. | 297/378.12 |
| 5,566,431 A * | 10/1996 | Haglund | 24/633 |
| 5,685,612 A * | 11/1997 | MacDonald et al. | 297/378.1 |
| 6,073,986 A * | 6/2000 | Neale et al. | 296/63 |
| 6,135,558 A * | 10/2000 | Behrens et al. | 297/353 |
| 6,174,017 B1 * | 1/2001 | Salani et al. | 296/65.03 |
| 7,387,333 B2 * | 6/2008 | Seibold | 297/15 |
| 7,416,254 B2 * | 8/2008 | Jennings | 297/378.12 |
| 2002/0145324 A1 * | 10/2002 | Metzler et al. | 297/378.1 |
| 2013/0285430 A1 * | 10/2013 | Ohba | 297/367 P |

FOREIGN PATENT DOCUMENTS

| | | |
|---|---|---|
| JP | U1-53-144717 | 11/1978 |
| JP | U1-54-183024 | 12/1979 |
| JP | U-1-108836 | 7/1989 |
| JP | A-9-202166 | 8/1997 |
| JP | A-11-240366 | 9/1999 |
| JP | A-2002-142912 | 5/2002 |
| JP | A-2004-122966 | 4/2004 |

* cited by examiner

VEHICLE SEAT

BACKGROUND OF THE INVENTION

1. Field of the Invention

The invention relates to a vehicle seat and, more particularly, to a vehicle seat in which a hinge pin provided on a seat back is coupled to a retainer provided on a vehicle body side.

2. Description of Related Art

In an outer hinge of a fold-down rear seat back described in Japanese Patent Application Publication No. 9-202166 (JP 9-202166 A), a retainers that is fixed to a vehicle body side has a circular arc guide groove and a bearing hole that is continuous with the guide groove. When the rear seat back is assembled to the vehicle body side, each hinge pin provided on the rear seat back is inserted in the corresponding guide groove and is moved to the corresponding bearing hole. After that, when the rear seat back is displaced inward in the vehicle widthwise direction by a predetermined distance, the disc-shaped head portion of the hinge pin is arranged on the lower side of the half wall portion of the retainer. The half wall portion engages with the cylindrical head portion of the hinge pin to prevent the hinge pin from slipping out from the bearing hole of the retainer. By so doing, it is easy to assemble the rear seat back to the vehicle body side, and each outer hinge is formed at low cost.

However, in the above described outer hinge, the upper end side of the retainer is open in order to insert the hinge pin to the guide groove of the retainer. Therefore, the hinge pin may be visually recognized from the inside of a vehicle cabin via the opening, so there is room for improvement in terms of improving the external appearance.

SUMMARY OF THE INVENTION

The invention provides a vehicle seat that is able to improve the external appearance.

An aspect of the invention relates to a vehicle seat. The vehicle seat includes: a retainer that is provided on a vehicle body side and that has a slit formed in a side wall portion of the retainer, the slit being open at an upper end side of the side wall portion; a hinge pin that is provided at a lower end side on a side portion of a seat back and that is inserted in the slit to couple the seat back to the vehicle body side via the retainer; and a cover that is attached to any one of the retainer and the hinge pin and that covers the hinge pin.

With the vehicle seat according to the above aspect, the slit is formed in the side wall portion of the retainer provided on the vehicle body side and is open at the upper end side of the side wall portion. The hinge pin provided at the lower end side on the side portion of the seat back is inserted in the slit to thereby couple the seat back to the vehicle body side via the retainer. Furthermore, in the vehicle seat, the hinge pin is covered with the cover attached to any one of the retainer and the hinge pin. By so doing, it is possible to prevent or suppress the hinge pin from being visually recognized from the inside of the vehicle cabin.

In the vehicle seat according to the above aspect, the cover may have an engaging portion, and the engaging portion may be engaged with the retainer to attach the cover to the retainer.

With the vehicle seat according to the above aspect, the vehicle seat is configured as described above, so it is possible to easily carry out work for attaching the cover in a narrow space between the side portion of the seat back and the vehicle body side portion. That is, for example, an elastically deformable C-shaped engaging portion is provided on the cover, and the C-shaped engaging portion is engaged with the hinge pin to thereby make it possible to attach the cover to the hinge pin. However, the hinge pin is inserted in the slit formed in the side wall portion of the retainer, so it is difficult to carry out work for attaching the cover because of interference of the retainer. In terms of this point, in the aspect of the invention, the cover is attached to the retainer, so it is possible to easily carry out work for attaching the cover.

In the vehicle seat according to the above aspect, a plurality of the engaging portions may be provided on the cover, and the plurality of engaging portions may include a first engaging portion that is engaged with one end side of the retainer in a vehicle longitudinal direction.

With the vehicle seat according to the above aspect, the first engaging portion, which is one of the plurality of engaging portions provided on the cover, is engaged with one end side of the retainer in the vehicle longitudinal direction. Here, there is generally no allowable space in the vehicle transverse direction (vehicle widthwise direction) between the side portion of the seat back and the vehicle body side portion; however, there is mostly an open space in the vehicle longitudinal direction. In terms of this point, in the aspect of the invention, when the cover is attached to the retainer, the first engaging portion of the cover may be engaged with one end side of the retainer in the vehicle longitudinal direction by approaching in the vehicle longitudinal direction in which there is an allowable space. Through this engagement, the cover is positioned with respect to the retainer, so the other engaging portion provided on the cover may be easily engaged with the retainer. Thus, it is possible to further easily carry out work for attaching the cover to the retainer.

In the vehicle seat according to the above aspect, the plurality of engaging portions may include a second engaging portion that is engaged with the other end side of the retainer in the vehicle longitudinal direction.

With the vehicle seat according to the above aspect, when the cover is attached to the retainer, as in the case of the above described first engaging portion, the second engaging portion of the cover may be engaged with the other end side of the retainer in the vehicle longitudinal direction by approaching in the vehicle longitudinal direction in which there is an allowable space. Thus, it is possible to further easily carry out work for attaching the cover to the retainer.

In the vehicle seat according to the above aspect, when the cover is attached to the retainer, in a state where the first engaging portion is inserted in a first engaging hole formed at the one end side of the retainer in the vehicle longitudinal direction, the cover may be pivoted in a direction in which a rear end side of the cover lowers to thereby engage the first engaging portion with a hole edge portion of the first engaging hole and engage the second engaging portion with the other end side of the retainer in the vehicle longitudinal direction.

With the vehicle seat according to the above aspect, in a state where the first engaging portion of the cover is inserted in the first engaging hole formed at the one end side of the retainer in the vehicle longitudinal direction as described above, the cover is pivoted in the direction in which the rear end side of the cover lowers to thereby engage the first engaging portion and second engaging portion of the cover with the retainer. In this way, the cover is pivoted to engage the engaging portions of the cover with the retainer, so, for example, in comparison with the configuration that the cover is moved in the vertical direction to engage the engaging portions of the cover with the retainer, it is possible to easily carry out work for attaching the cover even in a narrow accessible space.

In the vehicle seat according to the above aspect, the first engaging hole may be formed in a front wall portion of the retainer, and the second engaging portion may be engaged with a rear end side of the retainer.

With the vehicle seat according to the above aspect, in a state where the first engaging portion of the cover is inserted in the first engaging hole formed in the front wall portion of the retainer, the cover is pivoted to thereby engage the first engaging portion of the cover with the hole edge portion of the first engaging hole and engage the second engaging portion of the cover with the rear end side of the retainer. Here, there is usually a wide space (space in which a passenger is seated) on the front side of the retainer in the vehicle longitudinal direction, so it is possible to carry out work for attaching the cover from the seated space. Thus, it is possible to improve workability for attaching the cover.

In the vehicle seat according to the above aspect, the first engaging portion may be inserted into the first engaging hole through between the front wall portion of the retainer and a rear wall portion of the retainer.

With the vehicle seat according to the above aspect, the first engaging portion of the cover is inserted into the first engaging hole formed in the front wall portion through between the front wall portion and rear wall portion of the retainer. That is, at the time of attaching the cover to the retainer, the first engaging portion of the cover is inserted into the first engaging hole of the front wall portion from the inner side of the retainer. Therefore, in comparison with the configuration that the first engaging portion is inserted into the first engaging hole from the outer side of the retainer, the turning radius at the time of pivoting the cover thereafter may be set so as to be small. By so doing, it is possible to reduce a work space required for work for attaching the cover.

In the vehicle seat according to the above aspect, the second engaging portion may be a clip that is provided at a rear end side, of the cover, and the clip may be fitted and anchored to a second engaging hole that is formed at the rear end side of the retainer.

With the vehicle seat according to the above aspect, in a state where the first engaging portion of the cover is inserted in the first engaging hole formed in the front wall portion of the retainer, the cover is pivoted toward the obliquely lower side at the other side in the vehicle longitudinal direction to thereby engage the first engaging portion of the cover with the hole edge portion of the first engaging hole and fit and anchor the clip provided at the rear end side of the cover to the second engaging hole formed at the rear end side of the retainer. By so doing, the rear end side of the cover is anchored to the retainer, so it is possible to easily anchor the rear end side of the cover.

In the vehicle seat according to the above aspect, the cover may be provided with an engaging guide that is engaged with the hinge pin to guide pivot of the cover at the time of attaching the cover to the retainer.

With the vehicle seat according to the above aspect, when the cover is attached to the retainer, the engaging guide provided on the cover is engaged with the hinge pin to thereby guide pivot of the cover. By so doing, it is possible to improve workability at the time of pivoting the cover.

In the vehicle seat according to the above aspect, the engaging guide may be a circular arc-shaped portion of which an inner peripheral surface is in sliding contact with an outer peripheral surface of the hinge pin.

With the vehicle seat according to the above aspect, the inner peripheral surface of the circular arc-shaped portion provided on the cover is in sliding contact with the outer peripheral surface of the hinge pin to thereby guide pivot of the cover. By so doing, the configuration of the engaging guide may be simple.

In the vehicle seat according to the above aspect, the slit may have a vertical extending portion that extends in a vertical direction and a forward extending portion that extends from a lower end side of the vertical extending portion toward a vehicle front side, and the hinge pin may be arranged at a front end side of the forward extending portion, and displacement of the hinge pin toward a rear end side of the forward extending portion is restricted by the cover.

With the vehicle seat according to the above aspect, the slit formed in the side wall portion of the retainer has the vertical extending portion that extends in the vertical direction and the forward extending portion that extends from the lower end side of the vertical extending portion toward the vehicle front side, and the hinge pin inserted in the slit is arranged at the front end side of the forward extending portion. Therefore, when the seat back attempts to be displaced toward the vehicle front side at the time of, for example, a frontal collision of the vehicle, the hinge pin is engaged with the front edge of the forward extending portion to thereby make it possible to restrict displacement of the seat back. In addition, displacement of the hinge pin toward the vehicle rear side is restricted by the cover attached to the retainer, so, even at the time when the seat back attempts to be displaced toward the vehicle rear side at the time of a rear-end collision of the vehicle, it is possible to restrict displacement of the seat back.

In the vehicle seat according to, the above aspect, the cover may be formed of a resin material and has an impact absorbing portion that is arranged between the hinge pin and the rear wall portion of the retainer, and displacement of the hinge pin toward a rear end side of the forward extending portion may be restricted by the impact absorbing portion.

With the vehicle seat according to the above aspect, when the seat back attempts to be displaced toward the vehicle rear side at the time of a rear-end collision of the vehicle, the impact absorbing portion provided on the cover made of resin is compressed between the hinge pin and the rear wall portion of the retainer. By so doing, the impact absorbing portion is deformed to thereby make it possible to absorb collision energy.

As described above, in the vehicle seat according to the aspect of the invention, it is possible to improve the external appearance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8A to FIG. 8C are cross-sectional views for illustrating a method of attaching the cover shown in FIG. 5 to FIG. 7 to the retainer shown in FIG. 4, in which FIG. 8A is a view that shows a state where the pawl portion of the cover is inserted in the first engaging hole of the retainer, FIG. 8B is a view that shows a state where the circular arc-shaped portion of the cover is in contact with the large-diameter portion of a hinge pin, and FIG. 8C is a view that shows a state where the cover is attached to the retainer;

DETAILED DESCRIPTION OF EMBODIMENTS

Figure 1:
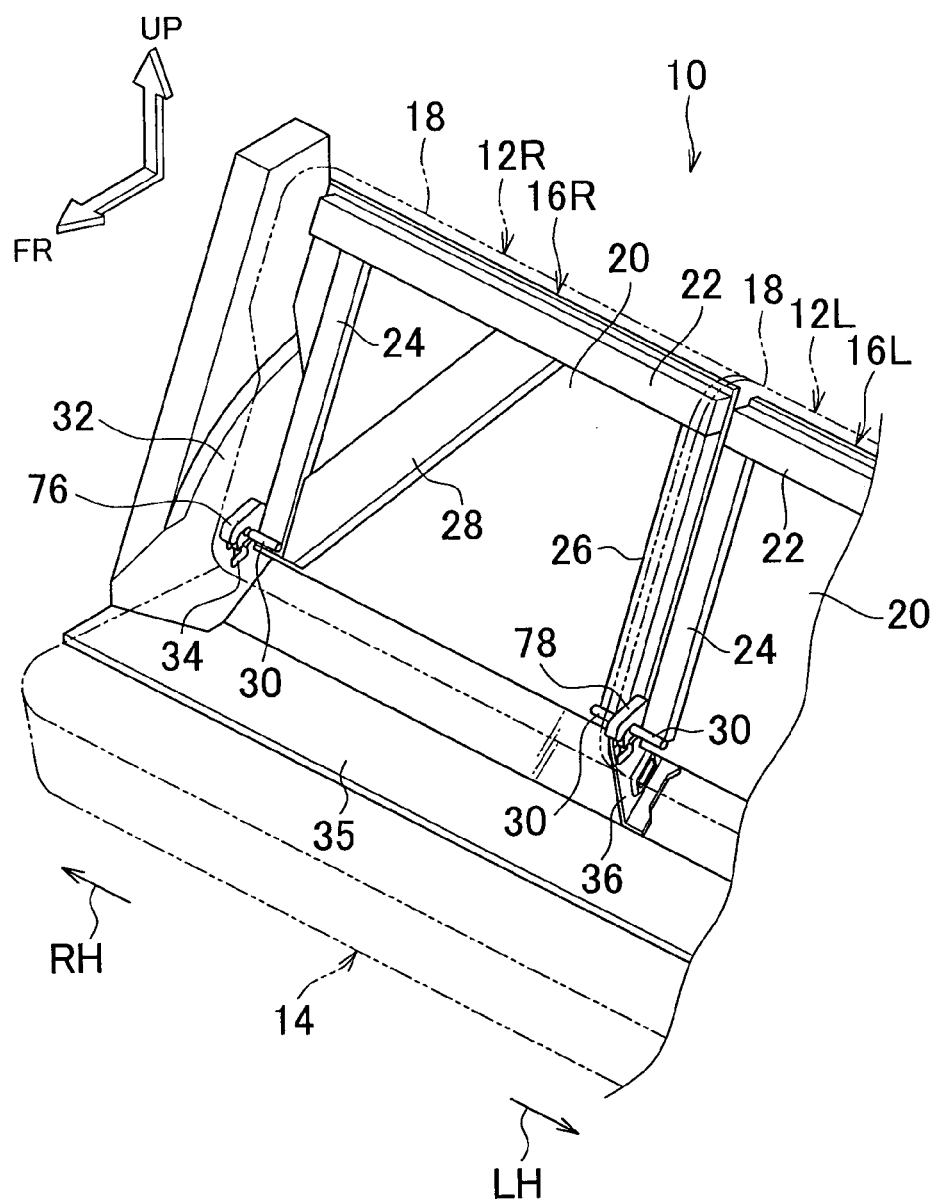
FIG. 1 is a perspective view that shows the partial configuration of a vehicle rear seat according to a first embodiment of the invention.

Hereinafter, a vehicle rear seat 10, which serves as a vehicle seat, according to a first embodiment of the invention will be described with reference to FIG. 1 to FIG. 11. Note that, in the drawings, the arrow FR indicates a vehicle front side, the arrow UP indicates a vehicle upper side, the arrow LH indicates a vehicle left side and the arrow RH indicates a vehicle right side. In addition, the longitudinal, transverse and vertical directions in the following description indicate the directions with respect to a vehicle in a state where the vehicle rear seat 10 is mounted on the vehicle; and the left and right sides respectively indicate the left side and the right side when viewed in the traveling direction (forward direction) of the vehicle.

As shown in FIG. 1, the vehicle rear seat 10 includes a pair of split-folding left and right rear seat backs 12L and 12R. These rear seat backs 12L and 12R are used to support the back of a passenger seated on a rear seat cushion 14, and respectively include rear seat back frames 16L and 16R that serve as frame members. Seat cushion pads (not shown) are respectively attached to the front surfaces of these rear seat back frames 16L and 16R. The seat cushion pads each are covered with a seat back skin 18. Note that the rear seat backs 12L and 12R are different in width along the vehicle transverse direction (vehicle widthwise direction) and part of the configuration; however, for the sake of convenience of description, in the present embodiment, like reference numerals are assigned to basically common components between the rear seat backs 12L and 12R.

The rear seat back frame 16R of the rear seat back 12R arranged at the vehicle right side is formed of a substantially flat-shaped panel member 20 and long frame members 22, 24, 26 and 28. The panel member 20 is made of a sheet metal. The frame members 22, 24, 26 and 28 are arranged on the front surface of the panel member 20. Similarly, the rear seat back frame 16L of the rear seat back 12L arranged at the vehicle left side includes a panel member 20 and frame members 22, 24 and 26; however, a frame member 28 is omitted.

The frame members 22, 24 and 26 respectively extend along the upper edge, right edge and left edge of the panel member 20. In addition, the frame member 28 extends between a vehicle right-side end portion at the lower end portion of the panel member 20 and a center portion in the vehicle transverse direction at the upper end portion of the panel member 20. These frame members 22, 24, 26 and 28 each are formed of a sheet metal in substantially a U shape in cross section. The open-side end portions of the frame members 22, 24, 26 and 28 are welded to the panel member 20.

Furthermore, hinge pins 30 are respectively welded to the lower end portions of the frame members 24 and 26. These hinge pins 30 are arranged such that the axial direction is aligned in the vehicle transverse direction. Each of the hinge pins 30 is formed of a body portion 30A, a small-diameter portion 30B and a large-diameter portion 30C (see FIG. 2). The body portion 30A is formed to protrude outward in the transverse direction from the corresponding one of the rear seat backs 12L and 12R. The small-diameter portion 30B and the large-diameter portion 30C are formed at the distal end side of a corresponding one of the body portions 30A. Each small-diameter portion 30B is arranged between the corresponding body portion 30A and the corresponding large-diameter portion 30C, and is formed so as to be smaller in diameter than those of the body portion 30A and large-diameter portion 30C.

Here, as shown in FIG. 1, the vehicle right-side hinge pin 30 of the rear seat back 12R arranged at the vehicle right side is rotatably coupled to the vehicle body side via a retainer 34 fixed to a vehicle right-side rear wheel house 32, and the vehicle left-side hinge pin 30 is rotatably coupled to the vehicle body side via a retainer 36 fixed to near the center portion in the vehicle transverse direction on the upper surface of a rear floor panel 35. On the other hand, the vehicle right-side hinge pin 30 of the rear seat back 12L arranged at the vehicle left side is rotatably coupled to the vehicle body side via the retainer 36, and the vehicle left-side hinge pin 30 (not shown) is rotatably coupled to the vehicle body via a retainer 38 (see FIG. 9 and FIG. 10) fixed to a vehicle left-side rear Wheel house (not shown). Note that the upper end sides of the rear seat backs 12L and 12R are respectively coupled to vehicle body side portions via lock mechanisms (not shown) and are restrained at an upright position shown in FIG. 1, and are allowed to be folded forward by releasing locking of the corresponding lock mechanisms.

Figure 3:
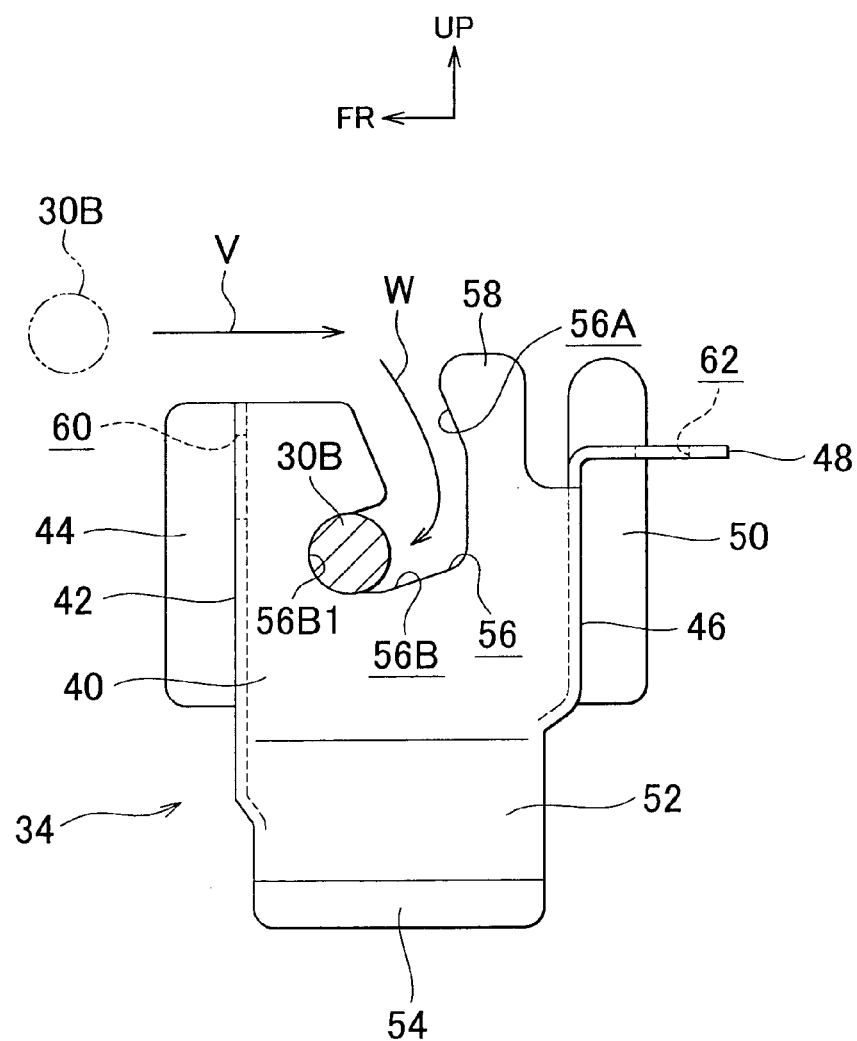
FIG. 3 is a side view that shows the retainer fixed to a vehicle right rear wheel house frame in FIG. 1 when viewed from the vehicle left side.

As shown in FIG. 3, the retainer 34 is formed by bending a sheet metal, and has a side wall portion 40. A front wall portion 42 extends from the front end of the side wall portion 40 toward the vehicle right side. A front flange portion 44 extends from the vehicle right-side end portion of the front wall portion 42 toward the vehicle front side.

In addition, a rear wall portion 46 extends from the rear end of the side wall portion 40 toward the vehicle right side. A clip fastening portion 48 extends from the upper end portion of the rear wall portion 46 toward the vehicle rear side, and a rear flange portion 50 extends from the vehicle right-side end portion of the rear wall portion 46 toward the vehicle rear side. Furthermore, an inclined wall portion 52 extends from the lower end of the side wall portion 40 toward the obliquely lower side of the vehicle right side, and a lower flange portion 54 extends from the lower end of the inclined wall portion 52 toward the vehicle lower side. The front flange portion 44, the rear flange portion 50 and the lower flange portion 54 are welded to the vehicle right-side rear wheel house 32. By so doing, the retainer 34 is fixed to the rear wheel house 32.

A slit 56 is formed in the side wall portion 40 of the retainer 34. The slit 56 is formed such that the side wall portion 40 is cut out downward from the upper end. The small-diameter portion 30B of the hinge pin 30 provided at the vehicle right side of the rear seat back 12R is inserted in the slit 56. In addition, the upper end portion of the side wall portion 40 of the retainer 34 is formed such that the vehicle rear side of the upper end portion of the side wall portion 40 with respect to the slit 56 protrudes toward the vehicle upper side beyond the vehicle front side of the upper end portion of the side wall portion 40 with respect to the slit 56, and the protruded portion serves as a hinge pin guide portion 58.

The above slit 56 has a vertical extending portion 56A that extends in the vertical direction and a forward extending portion 56B that extends from the lower end side of the vertical extending portion 56A toward the vehicle front side, and is formed in substantially an L shape in side view. The upper end side of the vertical extending portion 56A is slightly inclined toward the vehicle front side. The vertical extending portion 56A is open at the upper end of the side wall portion 40. The forward extending portion 56B is inclined so as to lower toward the front end side, and the front end portion 56B1 is formed in a circular arc shape having substantially the same diameter as that of the small-diameter portion 30B of the hinge pin 30.

The hinge pin 30 of which the small-diameter portion 30B is inserted in the slit 56 is arranged such that the small-diameter portion 30B is in contact with the front end portion 56B1 of the forward extending portion 56B. By so doing, the vehicle right side of the rear seat back 12R is rotatably supported by the vehicle body side via the retainer 34, and the body portion 30A and large-diameter portion 30C of the hinge pin 30 interfere with the side wall portion 40 to thereby restrict displacement of the rear seat back 12R in the vehicle transverse direction.

In addition, a first engaging hole 60 (through hole) is formed at the upper end side of the front wall portion 42 of the retainer 34. The first engaging hole 60 is formed in a long rectangular shape, and is arranged such that the longitudinal direction is aligned in the vehicle vertical direction. In addition, a circular second engaging hole 62 (through hole) is formed in the clip fastening portion 48 of the retainer 34. These first engaging hole 60 and second engaging hole 62 are provided in correspondence with the engaging portions of the cover 76 described later.

Figure 4:
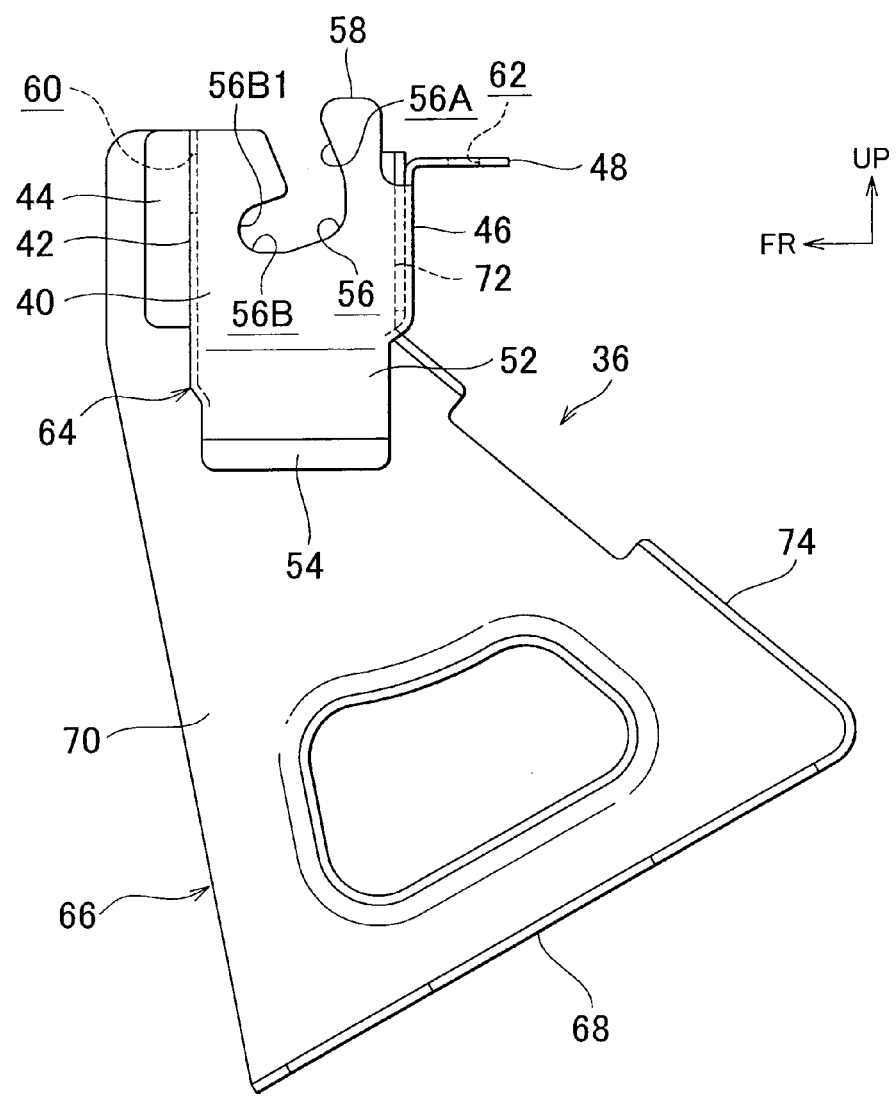
FIG. 4 is a side view that shows the retainer fixed to near the center of a rear floor panel in the vehicle transverse direction in FIG. 1 when viewed from the vehicle left side.

On the other hand, as shown in FIG. 4, the retainer 36 arranged near the center portion in the vehicle transverse direction includes a retainer body 64 and a bracket portion 66 (leg portion) that supports the retainer body 64. The bracket portion 66 is formed of a sheet metal, and has a lower wall portion 68, a side wall portion 70 and reinforcement wall portions 72 and 74. The lower wall portion 68 is fixedly fastened to the rear floor panel 35. The side wall portion 70 extends from the vehicle right-side end portion of the lower wall portion 68 toward the vehicle upper side. The reinforcement wall portions 72 and 74 respectively extend from the upper end side and lower end side at the rear end of the side wall portion 70 toward the vehicle left side.

The side wall portion 70 is formed in substantially a triangular shape when viewed in the vehicle transverse direction. A hinge pin guide portion 58 and a slit 56 that have the same structures as those of the hinge pin guide portion 58 and slit 56 of the retainer 34 are formed at the upper end portion of the side wall portion 70 (see FIG. 2). The small-diameter portion 30B of the hinge pin 30 provided at the vehicle left side of the rear seat back 12R is inserted in the slit 56. By so doing, the vehicle left side of the rear seat back 12R is rotatably supported by the vehicle body side via the retainer 36, and the body portion 30A and large-diameter portion 30C of the hinge pin 30 interfere with the side wall portion 70 to thereby restrict displacement of the rear seat back 12R in the vehicle transverse direction.

On the other hand, the retainer body 64 has basically similar components as those of the above described retainer 34 shown in FIG. 3; however, the rear flange portion 50 is omitted. Note that, in the retainer body 64, like reference numerals as those of the retainer 34 denote similar components to those of the retainer 34. The retainer body 64 is arranged on the vehicle left side of the upper end portion of the side wall portion 70, and the front flange portion 44 and the lower flange portion 54 are welded to the bracket portion 66. In addition, the rear wall portion 46 of the retainer body 64 is arranged on the vehicle rear side of the reinforcement wall portion 72, and is welded to the rear surface of the reinforcement wall portion 72. By so doing, the retainer body 64 is fixed to the side wall portion 70 (bracket portion 66).

The small-diameter portion 30B of the hinge pin 30 provided at the vehicle right side of the rear seat back 12L is inserted in the slit 56 of the retainer body 64. By so doing, the vehicle right side of the rear seat back 12L is rotatably supported by the vehicle body side via the retainer 36, and the body portion 30A and large-diameter portion 30C of the hinge pin 30 interfere with the side wall portion 40 of the retainer body 64 to thereby restrict displacement of the rear seat back 12L in the vehicle transverse direction.

Note that the vehicle left-side hinge pin 30 (not shown) provided on the rear seat back 12L is coupled to the vehicle body side via the retainer 38 (see FIG. 9 and FIG. 10) fixed to the vehicle left-side rear wheel house (not shown), as described above. The retainer 38 has the same configuration as that of the above described retainer 34 except that the retainer 38 and the retainer 34 are formed to have a symmetric shape, and the vehicle left side of the rear seat back 12L is rotatably supported by the vehicle body side via the retainer 38.

Figure 2:
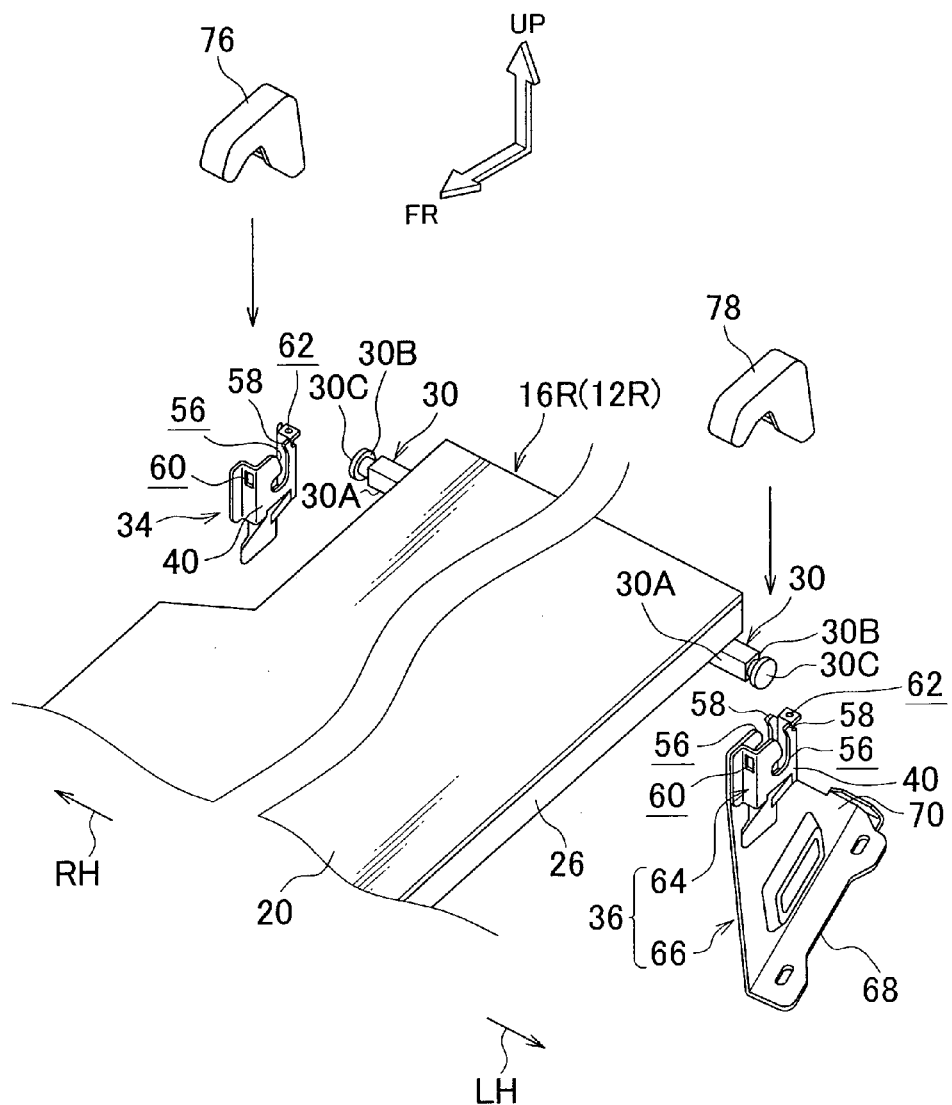
FIG. 2 is an exploded perspective view that shows the configuration of a rear seat back frame, retainers and covers of the vehicle rear seat shown in FIG. 1.
Figure 10:
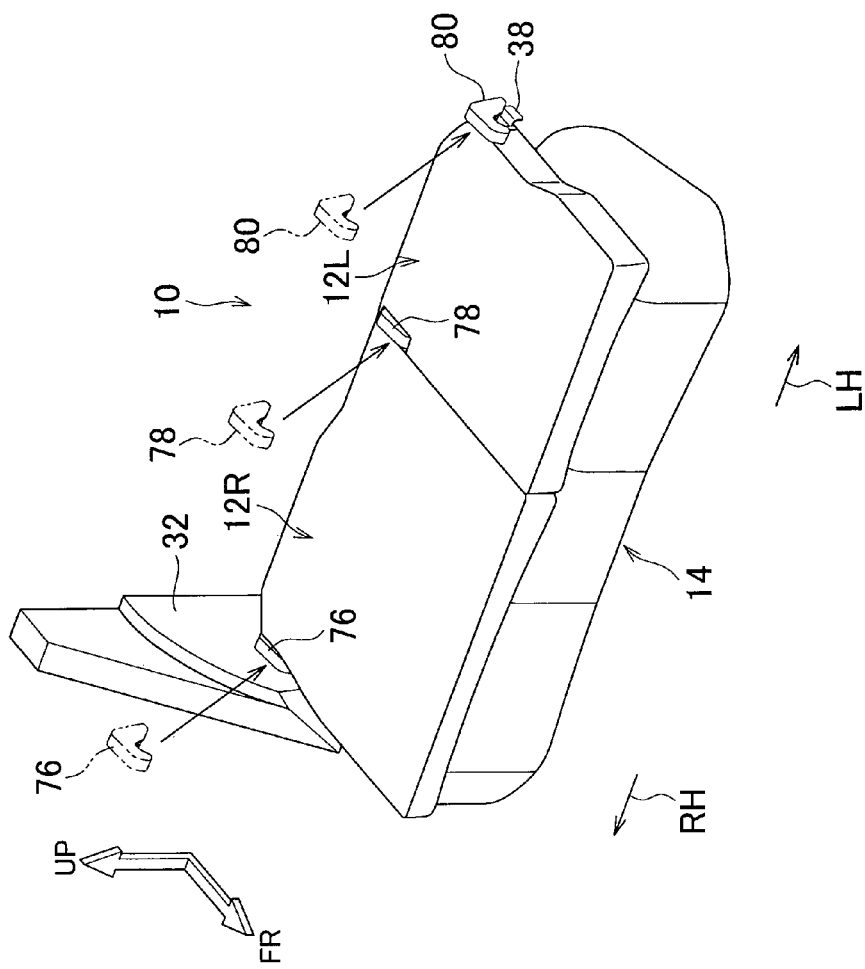
FIG. 10 is a perspective view for illustrating a working method for attaching the covers to the retainers after the work shown in FIG. 9.

Here, in the present embodiment, covers 76, 78 and 80 are respectively attached to the above described retainers 34, 36 and 38 (see FIG. 1, FIG. 2 and FIG. 10). The main portions of these covers 76, 78 and 80 basically have the same structure, so, first, the cover 78 attached to the retainer 36 arranged at the center portion in the vehicle transverse direction will be described here.

Figure 5:
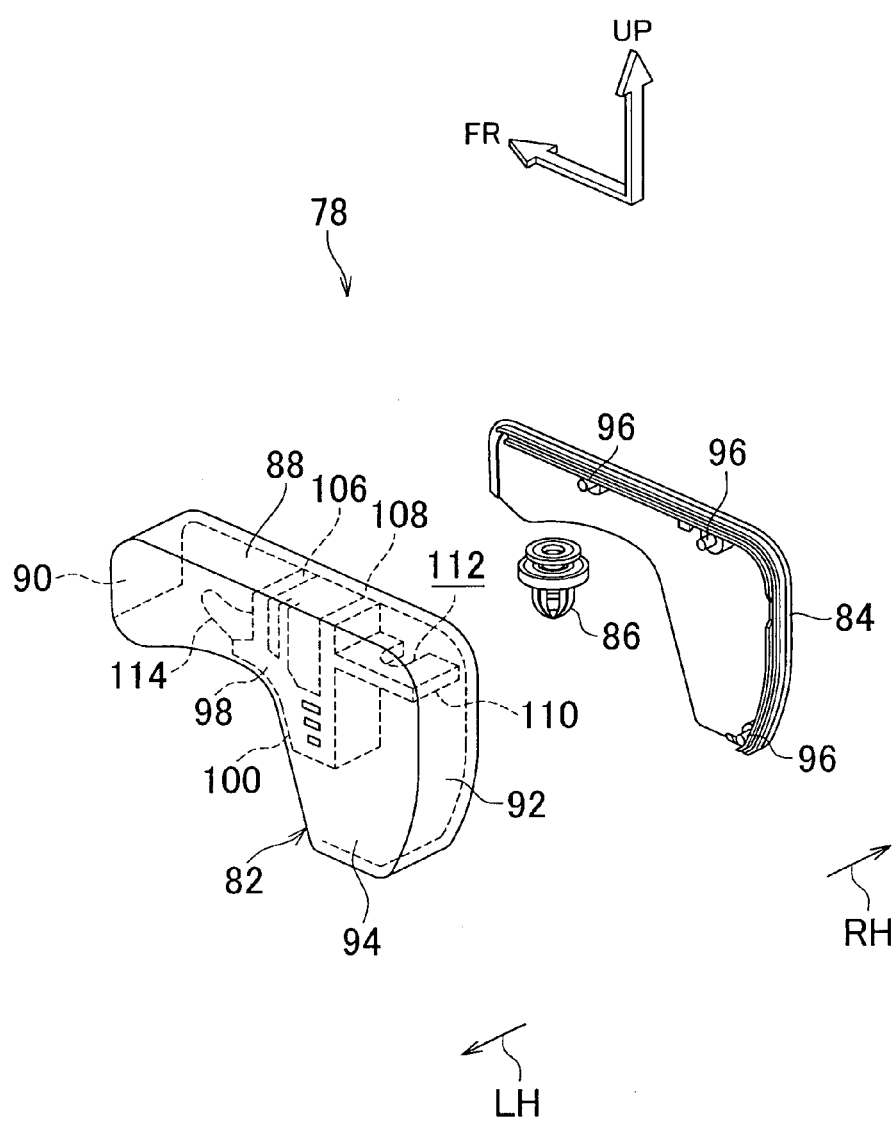
FIG. 5 is an exploded perspective view of the cover attached to the retainer shown in FIG. 4.

As shown in FIG. 5, the cover 78 is formed of a cover body 82, a closing plate, 84 and a clip 86. The closing plate 84 and the clip 86 are attached to the cover body 82. The cover body 82 is formed by, for example, injection molding of a resin material. The cover body 82 has an upper wall 88, a front wall 90, a rear wall 92 and a left wall 94, and is formed in substantially a box shape such that the vehicle right side and the vehicle lower side are open. The vehicle right-side opening of the cover body 82 is closed by the closing plate 84. The closing plate 84 is formed by, for example, injection molding of a resin material, and is formed in a similar shape to that of the left wall 94. The closing plate 84 is attached to the cover body 82 such that a plurality of protrusions 96 that protrude toward the cover body 82 are fitted into recesses (not shown) formed in the cover body 82. These cover body 82 and closing plate 84 are formed in a long shape in the vehicle longitudinal direction, and the rear end sides of these cover body 82 and closing plate 84 protrude toward the vehicle lower side beyond the front end sides thereof.

Figure 6:
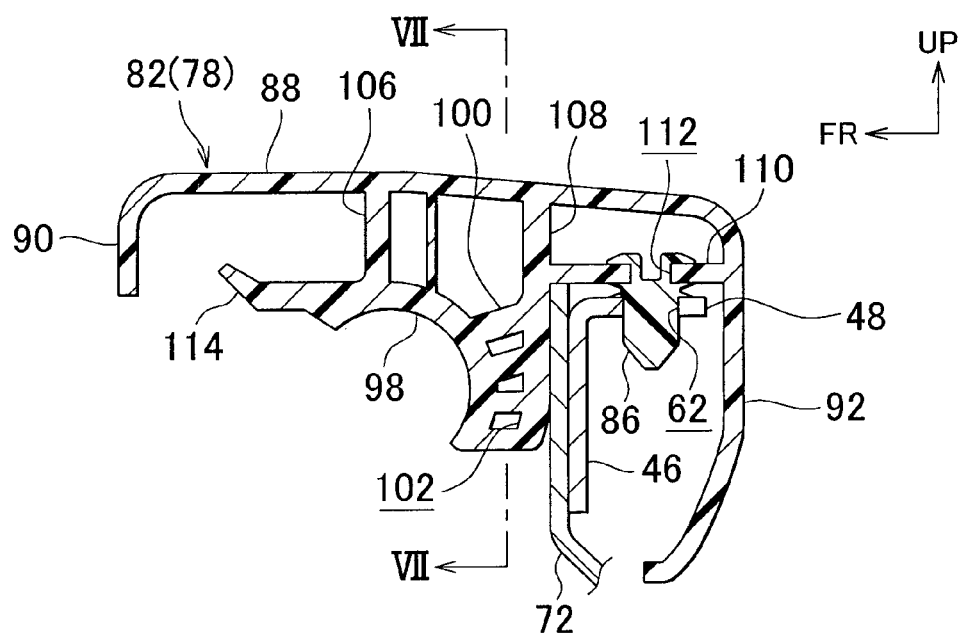
FIG. 6 is a longitudinal cross-sectional view of a cover body that is the component of the cover shown in FIG. 5.
Figure 7:
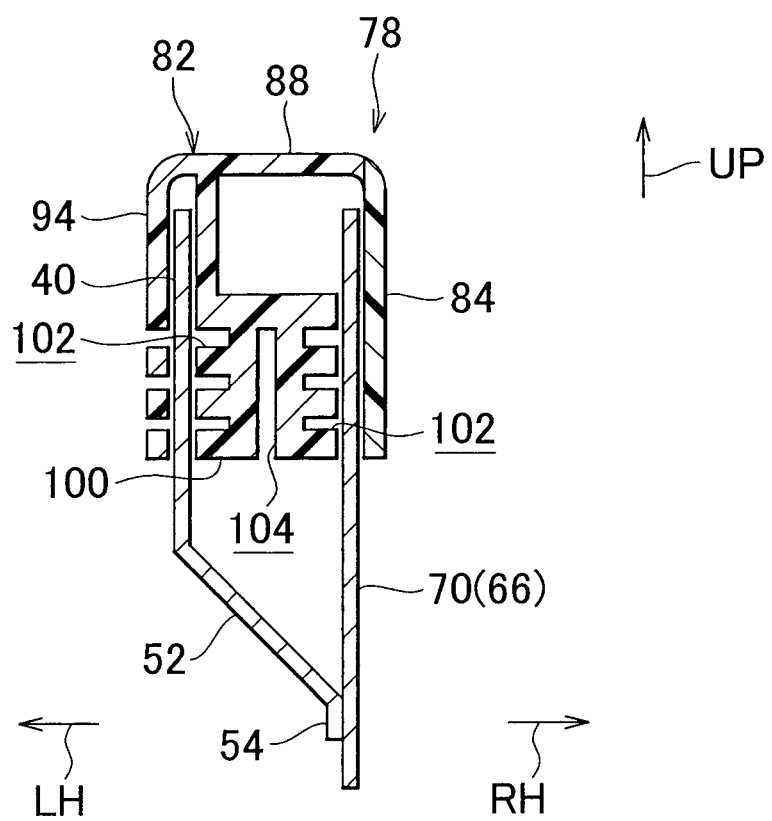
FIG. 7 is a longitudinal cross-sectional view that is taken along the line VII-VII in FIG. 6.
Figure 8:
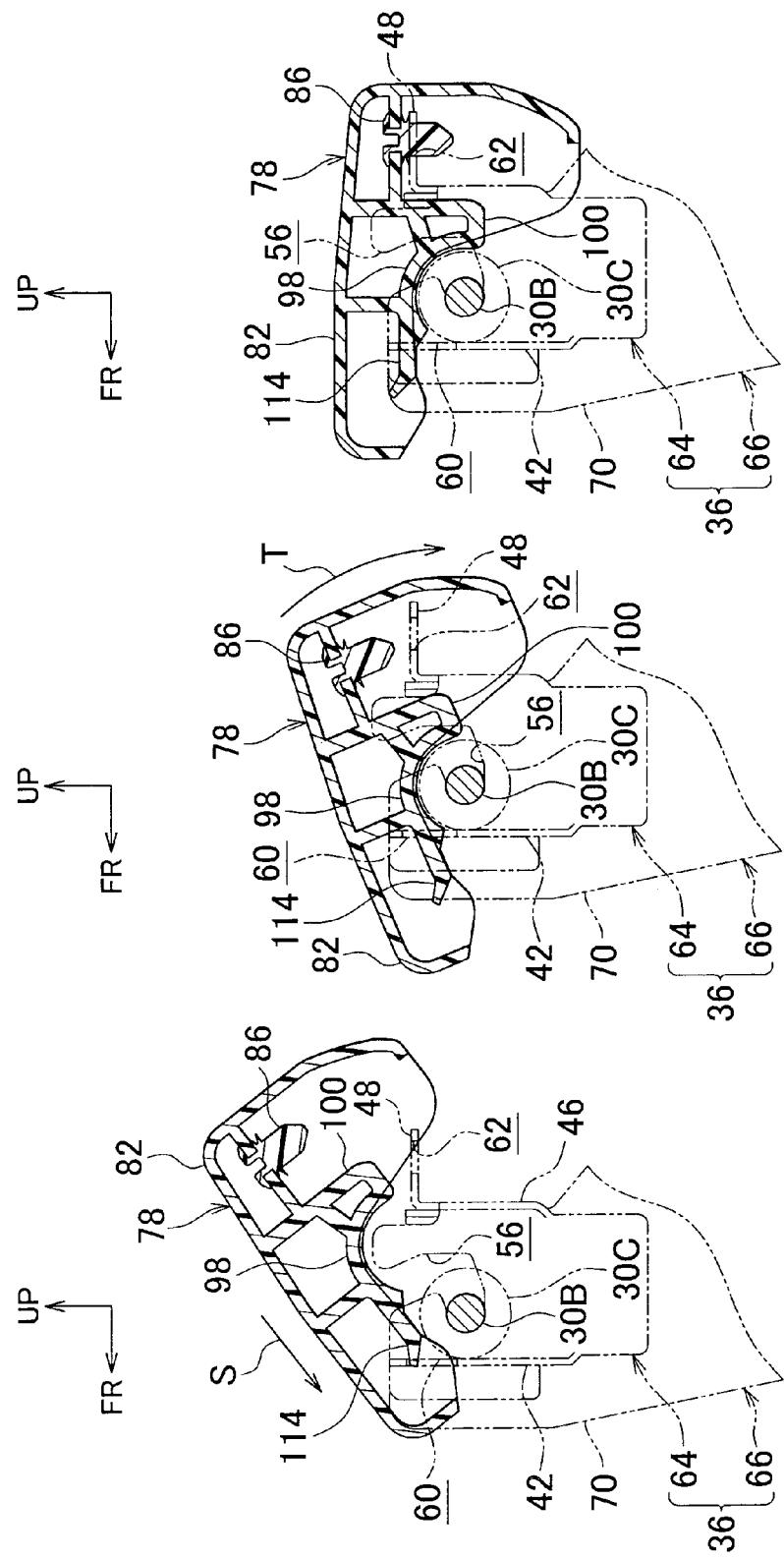

As shown in FIG. 6, a circular arc-shaped portion 98 formed in a circular arc shape in cross section is provided inside the cover body 82. The inner peripheral surface of the circular arc-shaped portion 98 is in contact with the outer peripheral surface of the large-diameter portion 30C of the hinge pin 30. The diameter of the inner peripheral surface of the circular arc-shaped portion 98 is set so as to be equal to the diameter of the large-diameter portion 30C. An impact absorbing portion 100 is integrally provided on the vehicle rear side of the circular arc-shaped portion 98. As shown in FIG. 7, a plurality of horizontal grooves 102 and a vertical groove 104 are formed in the impact absorbing portion 100.

The above described circular arc-shaped portion 98 and impact absorbing portion 100 are integrally connected to the upper wall 88 of the cover body 82 via ribs 106 and 108 that extend in the vehicle vertical direction. A clip anchoring wall 110 is integrally spanned between the rib 108 arranged adjacent to the vehicle rear side and the rear wall 92 of the cover body 82. A cutout 112 of which the vehicle right side is open is formed in the clip anchoring wall 110, and the clip 86 is fitted and anchored to the cutout 112. In addition, a pawl portion 114 integrally extends from the front end portion of the circular arc-shaped portion 98 toward the vehicle front side.

Here, when the above described cover 78 is attached to the retainer 36, first, as shown in FIG. 8A, the pawl portion 114, which is the first engaging portion, is inserted into the first engaging hole 60 (see FIG. 4) through between the front wall portion 42 and the rear wall portion 46 (that is, the inner side of the retainer body 64) via the upper end opening of the retainer body 64 (see the arrow S in FIG. 8A). Subsequently, as shown in FIG. 8B, the cover 78 is pushed in toward the retainer 36 until the inner peripheral surface of the circular arc-shaped portion 98 contacts with the outer peripheral surface of the large-diameter portion 30C of the hinge pin 30. Then, in a state where the inner peripheral surface of the circular arc-shaped portion 98 is in contact with the outer peripheral surface of the large-diameter portion 30C, the cover 78 is pivoted about the large-diameter portion 30C of the hinge pin 30 in the arrow T direction in FIG. 8B, that is, in the direction in which the rear end side of the cover 78 lowers. At this time, the inner peripheral surface of the circular arc-shaped portion 98 slides over the outer peripheral surface of the large-diameter portion 30C to thereby guide the pivot of the cover 78. By so doing, as shown in FIG. 8C, the clip 86 (second engaging portion) is fitted to (engaged with) the second engaging hole 62 of the retainer body 64. By so doing, the clip 86, that is, the rear end side of the cover 78, is fitted and anchored (fastened) to the clip anchoring portion 48 of the retainer body 64. In addition, the cover 78 is pivoted as described above to thereby cause the pawl portion 114 of the cover 78 to contact with the upper edge of the first engaging hole 60. By so doing, the cover 78 is prevented from slipping out from the retainer 36.

The cover 78 covers the upper end portion of the retainer 36 and the distal end side (portion that protrudes outward of the rear seat back 12R) of the hinge pin 30 from the vehicle upper side. In addition, the impact absorbing portion 100 is arranged between the circular arc-shaped portion 98 and the rear wall portion 46 (reinforcement wall portion 72) of the retainer 36, and the inner peripheral surface of the circular arc-shaped portion 98 is in contact with the vehicle upper side and vehicle rear side of the outer peripheral surface of the large-diameter portion 30C of the hinge pin 30. By so doing, the hinge pin 30 is restrained to the front end side of the slit 56 (front end side of the forward extending portion 56B) to thereby restrict displacement of the hinge pin 30 in the vehicle longitudinal direction and the vehicle vertical direction.

On the other hand, the cover 76 attached to the vehicle right-side retainer 34 has basically similar components to those of the above described cover 78; however, the closing plate 84 is omitted. That is, the cover 76 and the cover 78 may have the same cover body 82, but the closing plate 84 is provided only for the cover 78 attached to the retainer 36 arranged at the center portion in the vehicle transverse direction. In addition, the cover 80 attached to the vehicle left-side retainer 38 has basically similar components to those of the above described cover 78; however, the closing plate 84 is omitted, and the cover body 82 of the cover 80 and the cover body 82 of the cover 78 are formed in a symmetric shape (the cover body 82 of the cover 80 has a shape such that the vehicle left side and the vehicle lower side are open). The upper end portion of the retainer 34 and the distal end side of the hinge pin 30 supported by the retainer 34 are covered with the cover 76, and displacements of the hinge pin 30 in the vehicle longitudinal direction and the vehicle vertical direction are restricted by the retainer 34 and the cover 76. The upper end portion of the retainer 38 and the distal end side of the hinge pin 30 supported by the retainer 38 are covered with the cover 80, and displacements of the hinge pin 30 in the vehicle longitudinal direction and the vehicle vertical direction are restricted by the retainer 38 and the cover 80.

Next, the operations and advantageous effects of the first embodiment will be described.

In the above configured vehicle rear seat 10, the hinge pins 30 are respectively covered with the covers 76, 78 and 80 attached to the retainers 34, 36 and 38. By so doing, it is possible to prevent the hinge pins 30 from being visually recognized from the inside of the vehicle cabin, so it is possible to improve the external appearance. In addition, it is possible to prevent or effectively suppress entry of foreign matter to the inside (between the front wall portion 42 and the rear wall portion 46) of each of the retainers 34, 36 and 38 by a corresponding one of the covers 76, 78 and 80. Thus, it is possible to avoid a problem, such as inhibition of smooth pivot of the hinge pins 30 and insanitation of the insides of the retainers 34, 36 and 38, due to the entry of foreign matter. In addition, the vehicle rear seat 10 is excellent in workability at the time of assembling the rear seat backs 12R and 12L to the retainers 34, 36 and 38. That is, in the outer hinge of the fold-down rear seat back described in Background Art, the rear seat back needs to be displaced in the vehicle widthwise direction after the rear seat back is inserted into the guide groove of the retainer; however, the weight of the rear seat back is large, so workability is extremely poor, and a large burden is placed on a worker. In terms of this point, in the vehicle rear seat 10, it is not necessary to displace the rear seat backs 12R and 12L in the vehicle widthwise direction at the time of assembling the rear seat backs 12R and 12L to the retainers 34, 36 and 38, so workability may be improved. In addition, in the outer hinge of the fold-down rear seat back described in Background Art, the rear seat back is displaced in the vehicle widthwise direction to thereby engage the half wall portion of the retainer with the disc-shaped head portion of the hinge pin, so there are restrictions on the retainers, the hinge pins, and the like, on the basis of the relationship among assembling procedure, assembling path, and the like. In terms of this point, in the vehicle rear seat 10, there are no such restrictions, so it is possible to improve the flexibility of the retainers, the hinge pins, and the like.

In addition, in the vehicle rear seat 10, the pawl portions 114 and the clips 86 provided on the cover bodies 82 of the covers 76, 78 and 80 are respectively engaged with the retainers 34, 36 and 38 to thereby attach the covers 76, 78 and 80 to the retainers 34, 36 and 38. Therefore, work for attaching the covers 76, 78 and 80 in a narrow space between the side portions of the rear seat backs 12L and 12R and the vehicle body side portions may be made easy.

That is, for example, an elastically deformable C-shaped engaging portion is provided on each cover body 82, and the C-shaped engaging portion is engaged with the large-diameter portion 30C of each hinge pin 30 to thereby make it possible to attach the covers 76, 78 and 80 to the corresponding hinge pins 30. However, the hinge pins 30 are respectively inserted in the slits 56 of the retainers 34, 36 and 38, so it is difficult to carry out work for attaching the covers 76, 78 and 80 because of interference of the retainers 34, 36 and 38. In terms of this point, in the present embodiment, the covers 76, 78 and 80 are respectively attached to the retainers 34, 36 and 38, so it is possible to easily carry out work for attaching the covers 76, 78 and 80.

Furthermore, in the vehicle rear seat 10, the cover bodies 82 of the covers 76, 78 and 80 each include the pawl portion 114 (first engaging portion) that is engaged with the front wall portion 42 (one end side in the vehicle longitudinal direction) of the corresponding one of the retainers 34, 36 and 38. Here, there is no allowable space in the vehicle transverse direction (vehicle widthwise direction) between the side portions of the rear seat backs 12L and 12R and the vehicle body side portions; however, there is an open space in the vehicle longitudinal direction. Therefore, in the present embodiment, when the covers 76, 78 and 80 are respectively attached to the retainers 34, 36 and 38, the pawl portions 114 (first engaging portions) of the covers 76, 78 and 80 are respectively engaged with the front wall portions 42 of the retainers 34, 36 and 38 from the vehicle front side (in the vehicle longitudinal direction) in which there is an allowable space. Through this engagement, the covers 76, 78 and 80 are respectively positioned with respect to the retainers 34, 36 and 38, so the clips (second engaging portions) attached to the cover bodies 82 may be easily engaged with the retainers 34, 36 and 38. Thus, it is possible to further easily carry out work for attaching the covers 76, 78 and 80 to the retainers 34, 36 and 38.

Furthermore, in the vehicle rear seat 10, the clips. 86 provided on the covers 76, 78 and 80 are respectively engaged with the clip fastening portions 48 provided at the rear end sides (the other end sides in the vehicle longitudinal direction) of the retainers 34, 36 and 38. Therefore, when the covers 76, 78 and 80 are attached to the retainers 34, 36 and 38, as in the case of the above described pawl portions 114, the clips 86 of the covers 76, 78 and 80 may be engaged with the clip fastening portions 48 of the retainers 34, 36 and 38 from the vehicle front side (in the vehicle longitudinal direction) in which there is an allowable space. Thus, it is possible to further easily carry out work for attaching the covers to the retainers 34, 36 and 38.

In addition, in the vehicle rear seat 10, when the covers 76, 78 and 80 are respectively attached to the retainers 34, 36 and 38, the covers 76, 78 and 80 are pivoted in the direction in which the rear end sides of the covers 76, 78 and 80 lower in a state where the pawl portions 114 are respectively inserted in the first engaging holes 60 formed in the front wall portions 42 of the retainers 34, 36 and 38. By so doing, the pawl portions 114 are respectively engaged with the upper edge portions of the first engaging holes 60, and the clips 86 are respectively fitted into the second engaging holes 62 and are respectively fastened to the clip fastening portions 48. In this way, the covers 76, 78 and 80 are pivoted to engage the pawl portions 114 and the clips 86 (engaging portions) with the retainers 34, 36 and 38, so, for example, in comparison with the configuration that the covers 76, 78 and 80 are moved (lowered) in the vertical direction to engage the engaging portions of the covers 76, 78 and 80 with the retainers 34, 36 and 38, it is possible to easily carry out work for attaching the covers 76, 78 and 80 even in a narrow accessible space.

In addition, in the vehicle rear seat 10, as described above, the first engaging holes 60 into which the pawl portions 114 are inserted are respectively formed in the front wall portions 42 of the retainers 34, 36 and 38, and the clip fastening portions 48 to which the clips 86 are fastened are respectively provided at the rear end sides of the retainers 34, 36 and 38. Here, there is a wide space, which serves as a space in which a passenger is seated, on the vehicle front side of the retainers 34, 36 and 38, so, in the present embodiment, with the above described configuration, the pawl portions 114 that serve as the first engaging portions may be easily inserted into the first engaging holes 60 from the space in which a passenger is seated. Similarly, the clips 86 that serve as the second engaging portions may also be fastened from the space in which a passenger is seated. By so doing, it is possible to improve workability for attaching the covers 76, 78 and 80.

Figure 9:
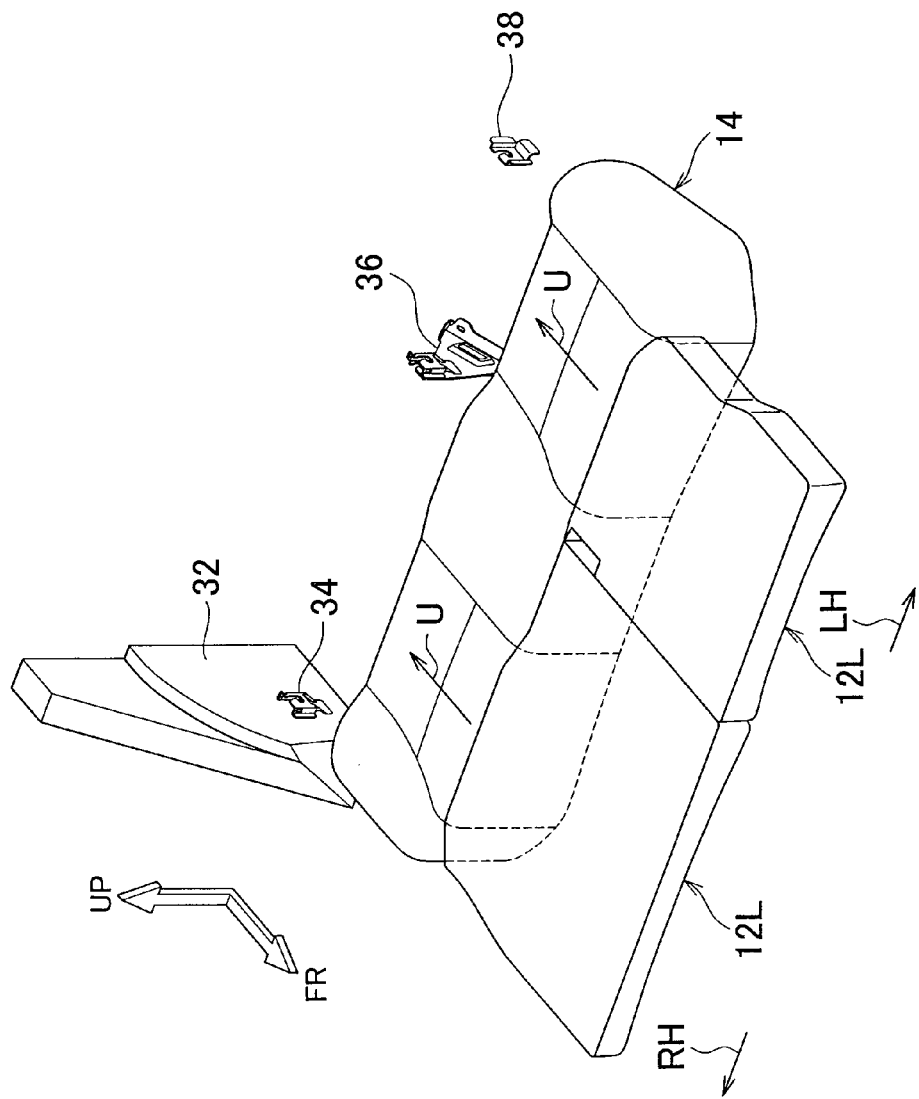
FIG. 9 is a perspective view for illustrating a working method for coupling the pair of left and right rear seat backs shown in FIG. 1 to retainers.

Note that FIG. 9 and FIG. 10 show perspective views for illustrating a method of assembling the rear seat backs 1'2L and 12R to the vehicle body side. As shown in FIG. 9, when the rear seat backs 12L and 12R are assembled to the vehicle body side, the rear seat backs 12L and 12R are brought close to the retainers 34, 36 and 38 from the vehicle front side of the rear seat cushion 14 assembled to the vehicle body side (see the arrow U in FIG. 9). In this case, assembling work may be carried out while the heavy rear seat backs 12L and 12R are mounted on the rear seat cushion 14, so it is possible to significantly reduce a burden on a worker.

Subsequently, the hinge pins 30 (not shown in FIG. 9 and FIG. 10) of the rear seat backs 12L and 12R are respectively inserted into the slits 56 of the retainers 34, 36 and 38. In this case, as indicated by the arrows V and W in FIG. 3, the small-diameter portion 30B of each hinge pin 30 contacts with the hinge pin guide portion 58 to be guided into the corresponding slit 56. The small-diameter portion 30B of each hinge pin 30 inserted in the corresponding slit 56 is guided by the upper end-side slope of the vertical extending portion 56A to lower within the vertical extending portion 56A, and is guided by the slope of the forward extending portion 56B to lower toward the front end side of the forward extending portion 56B. By so doing, as the small-diameter portion 30B contacts with the front end portion 56B1 of the forward extending portion 56B, work for coupling the rear seat backs 12L and 12R to the retainers 34, 36 and 38 completes.

Subsequently, the covers 76, 78 and 80 are attached to the retainers 34, 36 and 38, as shown in FIG. 10. In this case, as described above, it is only necessary that the pawl portions 114 are inserted into the first engaging holes 60 and then the covers 76, 78 and 80 are pivoted, so no tool is required. By so doing, it is possible to remarkably improve work for attaching the rear seat backs. That is, in the existing art, it is generally necessary to fasten the hinges, fixed to the vehicle body side, to the rear seat back frame by bolts, or the like, so a worker is required to take a tool and, therefore, a work burden is large; however, in the vehicle rear seat 10, it is possible to eliminate this situation.

In addition, in the vehicle rear seat 10, a worker may carry out the above described assembling work from the outer side of the vehicle body via a rear door opening without getting into the vehicle cabin. That is, in the existing art, in order to fasten the hinges to the rear seat back frame by bolts, a worker needs to work in the vehicle cabin; however, in the vehicle rear seat 10, a worker is able to attach the covers 76, 78 and 80 to the retainers 34, 36 and 38 by hand, so a worker does not need to get into the vehicle cabin. This may also significantly reduce a burden on a worker, and it is possible to significantly improve the efficiency of work.

In addition, in the vehicle rear seat 10, the pawl portions 114 of the covers 76, 78 and 80 are respectively inserted into the first engaging holes 60 through between the front wall portions 42 and rear wall portions 46 of the retainers 34, 36 and 38. That is, when the covers 76, 78 and 80 are attached to the retainers 34, 36 and 38, the pawl portions 114 of the covers 76, 78 and 80 are respectively inserted into the first engaging holes 60 of the front wall portions 42 from the inner sides of the retainers 34, 36 and 38. Therefore, in comparison with the configuration that the pawl portions 114 are respectively inserted into the first engaging holes 60 from the outer sides of the retainers 34, 36 and 38, the turning radius at the time of pivoting the covers 76, 78 and 80 thereafter may be set so as to be small. By so doing, it is possible to reduce a work space required for work for attaching the covers 76, 78 and 80.

Furthermore, in the vehicle rear seat 10, as the covers 76 78 and 80 are pivoted, the clips 86 are respectively fitted (inserted) into the second engaging holes 62 of the retainers 34, 36 and 38. By so doing, the clips 86, that is, the rear end sides of the covers 76, 78 and 80, are respectively fastened to the retainers 34, 36 and 38, so it is possible to easily anchor the rear end sides of the covers 76, 78 and 80.

In addition, in the vehicle rear seat 10, when the covers 76, 78 and 80 are respectively attached to the retainers 34, 36 and 38, the circular arc-shaped portions 98 (engaging guides) of the covers 76, 78 and 80 are respectively engaged with the large-diameter portions 30C of the hinge pins 30 to thereby guide the pivot of the covers 76, 78 and 80. By so doing, it is possible to improve workability at the time of pivoting the covers 76, 78 and 80. In addition, the inner peripheral surfaces of the circular arc-shaped portions 98 are respectively in sliding contact with the outer peripheral surfaces of the large-diameter portions 30C of the hinge pins 30, so it is possible to provide engaging guides with a simple structure.

Furthermore, in the vehicle rear seat 10, the slits 56 formed in the retainers 34, 36 and 38 each have the vertical extending portion 56A that extends in the vertical direction and the forward extending portion 56B that extends from the lower end side of the vertical extending portion 56A toward the vehicle front side, and each hinge pin 30 inserted in the corresponding slit 56 is arranged at the front end side of the forward extending portion 56B. Therefore, displacement of each hinge pin 30 toward the vehicle front side, the vehicle upper side and the vehicle lower side is restricted by the front end portion 56B1, upper end portion and lower end portion of the forward extending portion 56B. In addition, the impact absorbing portions 100 of the covers 76, 78 and 80 are respectively arranged between the circular arc-shaped portions 98 that are in contact with the hinge pins 30 and the rear wall portions 46 of the retainers 34, 36 and 38 to thereby restrict displacement of the hinge pins 30 toward the vehicle rear side. By so doing, it is possible to appropriately support various loads that act on the rear seat backs 12L and 12R.

Figure 11:
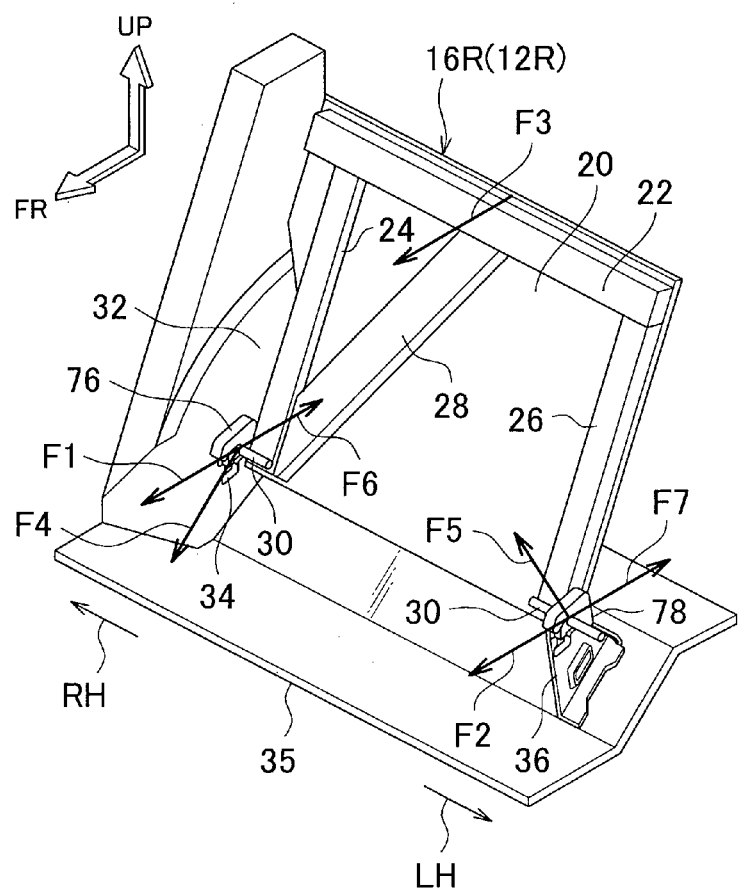
FIG. 11 is a perspective view for illustrating various loads that act on the rear seat back frame shown in FIG. 1.

That is, for example, in the case of the rear seat back 12R arranged at the vehicle right side, as shown in FIG. 11, a cargo placed in a luggage room attempts to inertially move toward the vehicle front side at the time of a frontal collision of the vehicle, and loads F1 and F2 from the cargo are exerted on the retainers 34 and 36 via the rear seat back frame 16R and the right and left hinge pins 30. Furthermore, a passenger attempts to inertially move toward the vehicle front side to exert a load F3 on the upper end portion of the rear seat back frame 16R via a seat belt (not shown) and to exert loads F4 and F5 from the seat belt (not shown) on the retainers 34 and 36 via the right and left hinge pins 30. On the other hand, at the time of a rear-end collision of the vehicle, loads F6 and F7 from a passenger who attempts to inertially move toward the vehicle rear side are exerted on the retainers 34 and 36 via the rear seat back frame 16R and the right and left hinge pins 30. These loads F1 to F7 are appropriately supported by restricting displacement of the hinge pins 30 by the retainers 34, 36 and 38 and the covers 76, 78 and 80. Thus, it is possible to improve collision safety (strength).

Furthermore, in the vehicle rear seat 10, when the above loads F6 and F7 at the time of a rear-end collision of the vehicle become larger than or equal to a predetermined value, the impact absorbing portions 100 provided on the resin covers 76, 78 and 80 are respectively compressed between the hinge pins 30 and the rear wall portions 46 of the retainers 34 and 36. By so doing, the impact absorbing portions 100 are deformed to thereby make it possible to absorb collision energy. Thus, it is possible to improve passenger protecting performance. The above described advantageous effect may also be basically similarly obtained by the rear seat back 12L.

Note that in the above first embodiment, the covers 76, 78 and 80 each include the impact absorbing portion 100; however, the aspect of the invention is not limited to this configuration. Instead of the impact absorbing portion, a hard portion resistant to deformation may be provided on each cover.

Next, a second embodiment of the invention will be described. Note that like reference numerals denote basically similar components and operations to those of the first embodiment and the description thereof is omitted.

Figure 12:
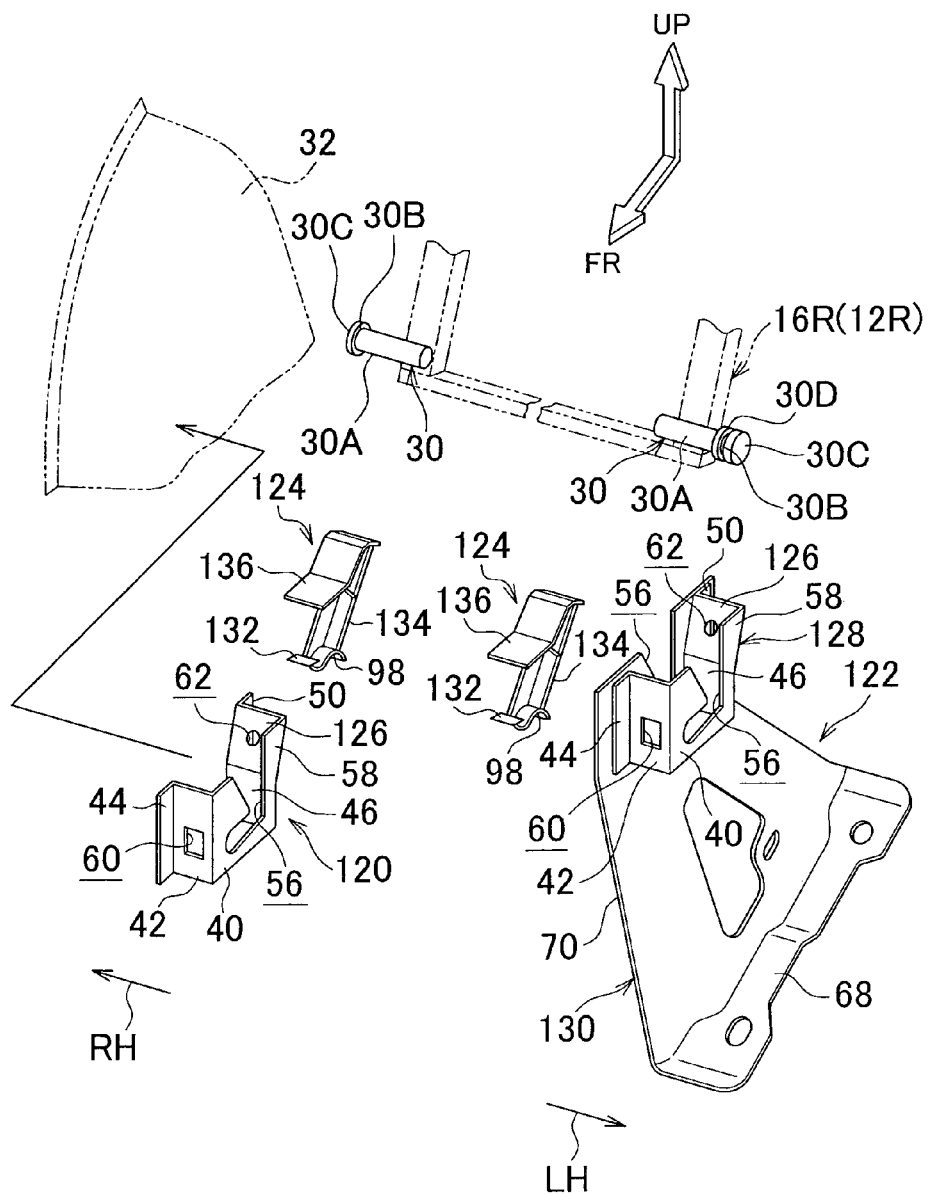
FIG. 12 is an exploded perspective view that shows the partial configuration of a vehicle seat according to a second embodiment of the invention.

FIG. 12 shows an exploded perspective view of the configuration of retainers 120 and 122 and covers 124 that serve as the components of a vehicle rear seat (vehicle seat) according to the second embodiment of the invention. This embodiment basically has similar components to those of the first embodiment; however, instead of the retainers 34 and 36 according to the first embodiment, the retainers 120 and 122 are provided, and the rear seat back 12R arranged at the vehicle right side via these retainers 120 and 122 is rotatably supported by the vehicle body side. Note that the rear seat back 12L (not shown in FIG. 12) arranged at the vehicle left side is supported by the vehicle body side via the retainer 122 and a retainer (not shown) (substitute for the retainer 38 according to the first embodiment). The retainer, which is the substitute for the retainer 38, and the retainer 120 are formed to have a symmetric shape.

Figure 13:
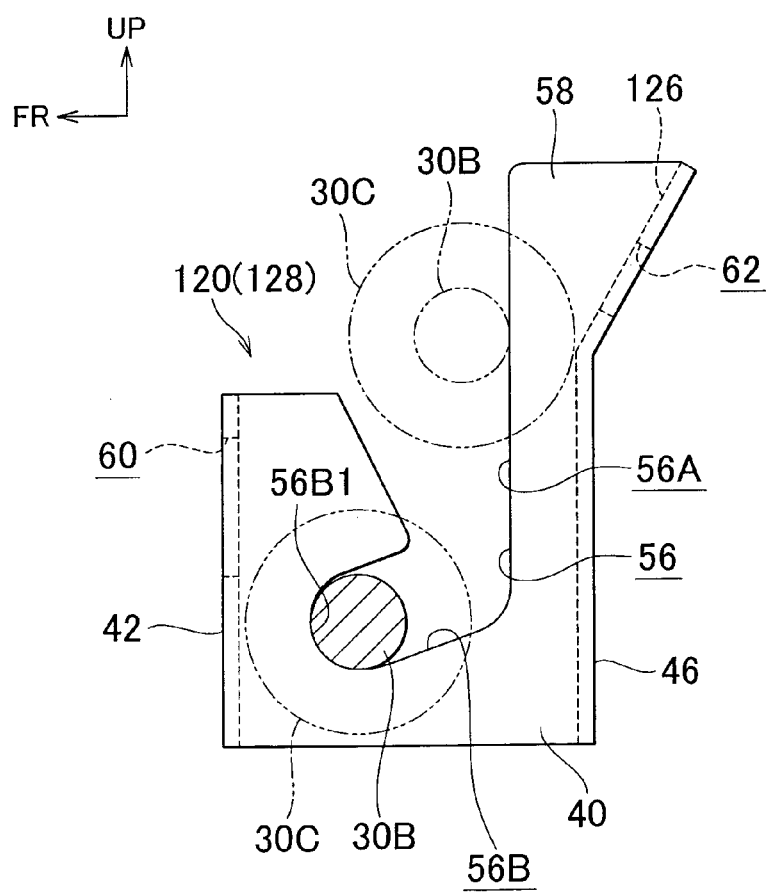
FIG. 13 is a side view that shows the partial configuration of a retainer (retainer body) shown in FIG. 12.

The retainer 120 basically has similar components to those of the retainer 34 according to the first embodiment; however, the inclined wall portion 52 and the lower flange portion 54 according to the first embodiment are omitted. In addition, as shown in FIG. 13, in the retainer 120, the clip fastening portion 126 extends from the upper end of the rear wall portion 46 toward the obliquely upper side of the vehicle rear side. The retainer 120 is fixed to the rear wheel house 32 such that the front flange portion 44 and the rear flange portion 50 (see FIG. 12, and not shown in FIG. 13) are welded to the vehicle right-side rear wheel house 32. The small-diameter portion 30B of the vehicle right-side hinge pin 30 provided on the rear seat back 12R is inserted in the slit 56 of the retainer 120. Note that the hinge pin 30 basically has similar components to those of the hinge pin 30 according to the first embodiment; however, the body portion 30A and the small-diameter portion 30B are formed to have the same diameter.

On the other hand, the retainer 122 includes a retainer body 128 that has the same configuration as that of the retainer 120 and a bracket portion 130 that has a similar configuration to that of the bracket portion 66 according to the first embodiment. Note that, in the bracket portion 130, like reference numerals denote similar components to those of the bracket portion 66.

The small-diameter portion 30B of the vehicle left-side hinge pin 30 provided on the rear seat back 12R is inserted in the slit 56 formed at the upper end side of the side wall portion 70 of the bracket portion 130. The hinge pin 30 has basically similar components to those of the hinge pin 30 according to the first embodiment; however, the body portion 30A and the small-diameter portion 30B are formed to have the same diameter, a flange portion 30D is provided between the small-diameter portion 30B and the body portion 30A, and the flange portion 30D and the large-diameter portion 30C interfere with the side wall portion 70 to thereby restrict displacement of the hinge pin 30, that is, the rear seat back 12R, in the vehicle transverse direction. In addition, the retainer body 128 is fixed to the bracket portion 130 such that the front flange portion 44 and the rear flange portion 50 are welded to the vehicle left-side surface at the upper end portion of the side wall portion 70.

Figure 14:
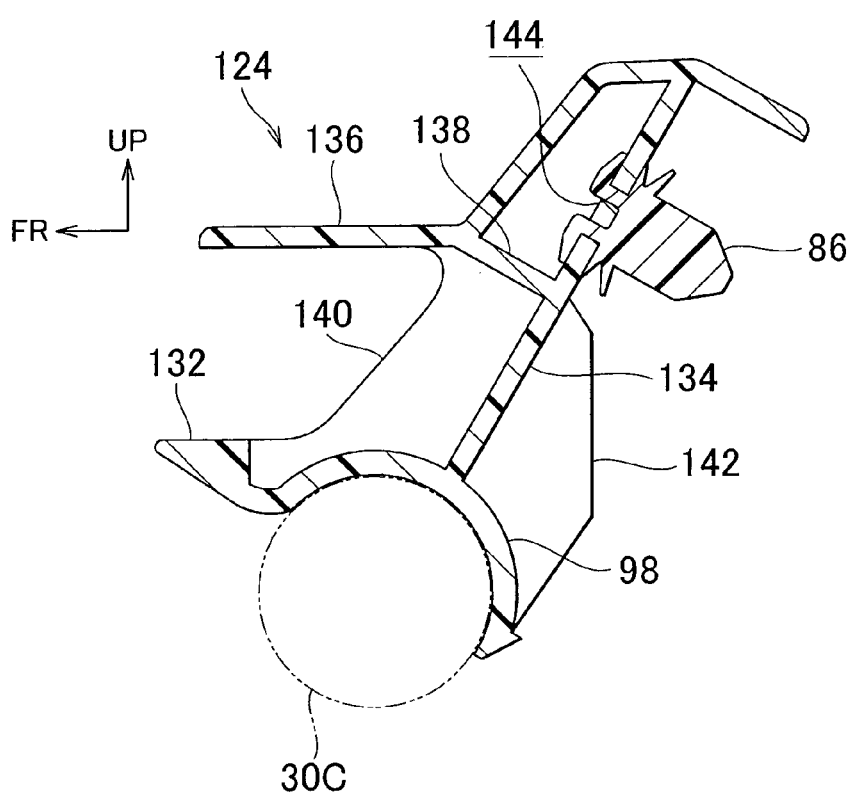
FIG. 14 is a longitudinal cross-sectional view that shows the configuration of a cover shown in FIG. 12.

On the other hand, the covers 124 shown in FIG. 12 are employed instead of the covers 76 and 78, and are respectively attached to the above described retainers 120 and 122. Each of the covers 124 is formed of a resin material, and, as shown in FIG. 14, has a circular arc-shaped portion 98 that has a basically similar configuration to that of the circular arc-shaped portion 98 according to the first embodiment. A pawl portion 132 that serves as a first engaging portion extends from the front end of each circular arc-shaped portion 98. The pawl portions 132 are respectively inserted into the first engaging holes 60 formed in the front wall portions 42 of the retainers 120 and 122 and are respectively in contact with the upper edge portions of the first engaging holes 60.

In addition, an inclined wall portion 134 extends from near the upper end of each circular arc-shaped portion 98 toward the obliquely upper side of the vehicle rear side, and the upper end of the inclined wall portion 134 is integrally connected to an upper wall portion 136. The upper wall portion 136 is formed such that the vehicle front-side portion extends in the horizontal direction, the center portion in the vehicle longitudinal direction is inclined so as to rise toward the vehicle rear side and the vehicle rear-side portion gradually lowers toward the vehicle rear side. The upper wall portion 136, the inclined wall portion 134 and the circular arc-shaped portion 98 are integrally connected by reinforcement ribs 138 and 140. In addition, a reinforcement rib 142 integrally extends from the lower end side on the vehicle rear side of the inclined wall portion 134 toward the vehicle rear side. Furthermore, a clip anchoring hole 144 is formed at the upper end side of the inclined wall portion 134, and the clip 86 is anchored to the clip anchoring hole 144. The clips 86 are respectively fitted and anchored to the second engaging holes 62 formed in the clip fastening portions 126 of the retainers 120 and 122.

When the above described covers 124 are respectively attached to the retainers 120 and 122, the pawl portions 132 are respectively inserted into the first engaging holes 60 through between the front wall portions 42 and the rear wall portions 46. Subsequently, the covers 124 are respectively pushed in toward the retainers 120 and 122 until the inner peripheral surfaces of the circular arc-shaped portions 98 respectively contact with the outer peripheral surfaces of the large-diameter portions 30C of the hinge pins 30. Then, in a state where the inner peripheral surfaces of the circular arc-shaped portions 98 are respectively in contact with the outer peripheral surfaces of the large-diameter portions 30C, the covers 124 are respectively pivoted about the large-diameter portions 30C of the hinge pins 30 in the direction in which the rear end sides of the covers 124 lower. At this time, the inner peripheral surfaces of the circular arc-shaped portions 98 respectively slide over the outer peripheral surfaces of the large-diameter portions 30C to thereby guide the pivot of the covers 124. By so doing, the clips 86 are respectively fitted and anchored (fastened) to the second engaging holes 62. In addition, the covers 124 are pivoted as described above to thereby cause the pawl portions 132 of the covers 124 to contact with the upper edges of the first engaging holes 60. By so doing, the covers 124 are prevented from slipping out from the retainers 120 and 122. In this state, the covers 124 are respectively accommodated inside the retainers 120 and 122, the upper end-side openings of the retainers 120 and 122 are respectively closed by the upper wall portions 136 of the covers 124, and the distal end sides of the hinge pins 30 are respectively covered with the upper wall portions 136 of the covers 124.

According to the thus configured embodiment as well, basically similar operations and advantageous effects as those of the first embodiment may be obtained. In addition, in this embodiment, the covers 124 are respectively accommodated inside the retainers 120 and 122, so the covers 124 may be arranged so as to be compact. Furthermore, in this embodiment, the retainer 120 and the retainer body 128 may have the same components, and the plurality of covers 124 may be formed of the same configuration, so it is possible to reduce the costs of the components.

Note that, in the above embodiments, the covers 76, 78, 80 and 124 are formed of a resin material; however, the aspect of the invention is not limited to this configuration. The material of the covers may be changed where appropriate.

In addition, in the above embodiments, each slit 56 includes the vertical extending portion 56A and the forward extending portion 56B; however, the aspect of the invention is not limited to this configuration. The configuration of each slit may be changed where appropriate.

In addition, in the above embodiments, the inner peripheral surface of the circular arc-shaped portion 98 that serves as an engaging guide is in sliding contact with the outer peripheral surface of the large-diameter portion 30C of the hinge pin 30; however, the aspect of the invention is not limited to this, configuration. The configuration of the engaging guide may be changed where appropriate.

In addition, in the above embodiments, the covers 76, 78, 80 and 124 each include the circular arc-shaped portion 98 that serves as an engaging guide; however, the aspect of the invention is not limited to this configuration. The engaging guide may be omitted.

In addition, in the above embodiments, the clips 86 (second engaging portions) provided at the rear end sides of the covers 76, 78, 80 and 124 are respectively fitted and anchored to the second engaging holes 62 formed in the retainers 34, 36, 38, 120 and 122; however, the aspect of the invention is not limited to this configuration. The configuration of each second engaging portion and the engaging structure of each second engaging portion and the corresponding retainer may be changed where appropriate.

Furthermore, in the above embodiments, the pawl portions 114 and 132 that serve as the first engaging portions are inserted into the first engaging holes 60 through between the front wall portions 42 and rear wall portions 46 of the retainers 34, 36, 38, 120 and 122 (the insides of the retainers); however, the aspect of the invention is not limited to this configuration. The first engaging portions may be inserted into the first engaging holes from the outsides of the retainers.

In addition, in the above embodiments, the first engaging holes 60 with which the pawl portions 114 and 132 (first engaging portions) are engaged are respectively formed in the front wall portions 42 of the retainers 34, 36, 38, 120 and 122, and the clips 86 (second engaging portions) are respectively engaged with the rear end sides of the retainers 34, 36, 38, 120 and 122; however, the aspect of the invention is not limited to this configuration. The first engaging holes may be respectively formed at the rear end sides of the retainers, and the second engaging portions may be respectively engaged with the front end sides of the retainers.

In addition, in the above embodiments, when the covers 76, 78, 80 and 124 are respectively attached to the retainers 34, 36, 38, 120 and 122, the covers 76, 78, 80 and 124 are pivoted; however, the aspect of the invention is not limited to this configuration. The method of attaching the covers to the retainers may be changed where appropriate. For example, the covers may be moved (lowered) in the vertical direction and attached to the retainers.

In addition, in the above embodiments, the clips 86 (second engaging portions) provided on the covers 76, 78, 80 and 124 are respectively engaged with the rear end sides (the other end sides in the vehicle longitudinal direction) of the retainers 34, 36, 38, 120 and 122; however, the aspect of the invention is not limited to this configuration. The second engaging portions may be respectively engaged with the front end sides, left end sides or right end sides of the retainers.

In addition, in the above embodiments, the pawl portions 114 and 132 provided on the covers 76, 78, 80 and 124 are respectively engaged with the front end sides (one end sides in the vehicle longitudinal direction) of the retainers 34, 36, 38, 120 and 122; however, the aspect of the invention is not limited to this configuration. The first engaging portions may be respectively engaged with the rear end sides, left end sides or right end sides of the retainers.

Furthermore, in the above embodiments, the covers 76, 78, 80 and 124 are respectively attached to the retainers 34, 36, 38, 120 and 122; however, the aspect of the invention is not limited to this configuration. The covers may be respectively attached to the hinge pins.

Other than the above, the aspect of the invention may be implemented in various forms without departing from the scope of the invention. In addition, of course, the scope of the invention is not limited to the above described embodiments.

The invention claimed is:

1. A vehicle seat comprising:
    a retainer that is provided on a vehicle body side and that has a slit formed in a side wall portion, the slit being open at an upper end side of the side wall portion;
    a hinge pin that is provided at a lower end side on a side portion of a seat back and that is inserted in the slit to couple the seat back to the vehicle body side via the retainer; and
    a cover that is attached to the retainer when a first engaging portion is engaged with a hole edge of a first engaging hole formed at one end side of the retainer in a vehicle longitudinal direction and a second engaging portion is engaged with the other end side of the retainer in the vehicle longitudinal direction, and that covers the hinge pin, wherein when the cover is attached to the retainer, in a state where the first engaging portion is inserted in the first engaging hole, the cover is pivoted in a direction in which a rear end side lowers.

2. The vehicle seat according to claim 1, wherein the first engaging hole is formed in a front wall portion of the retainer and the second engaging portion is engaged with a rear end side of the retainer.

3. The vehicle seat according to claim 2, wherein that the first engaging portion is inserted into the first engaging hole through between the front wall portion and a rear wall portion of the retainer.

4. The vehicle seat according to claim 3, wherein the second engaging portion is a clip that is provided at the rear end side of the cover, and the clip is fitted and anchored to a second engaging hole that is formed at the rear end side of the retainer.

5. The vehicle seat according to claim 1, wherein the cover is provided with an engaging guide that is engaged with the hinge pin to guide pivot of the cover at the time of attaching the cover to the retainer.

6. The vehicle seat according to claim 5, wherein the engaging guide is a circular arc-shaped portion of which an inner peripheral surface is in sliding contact with an outer peripheral surface of the hinge pin.

7. The vehicle seat according to claim 1, wherein the slit has a vertical extending portion that extends vertically and a forward extending portion that extends from a lower end side of the vertical extending portion toward a vehicle front side, the hinge pin is arranged at a front end side of the forward extending portion, and displacement of the hinge pin toward a rear end side of the forward extending portion is restricted by the cover.

8. The vehicle seat according to claim 7, wherein the cover is formed of a resin material and has an impact absorbing portion that is arranged between the hinge pin and a rear wall portion of the retainer, and displacement of the hinge pin toward the rear end side of the forward extending portion is restricted by the impact absorbing portion.

* * * * *